(12) United States Patent
Delsing

(10) Patent No.: US 6,532,828 B1
(45) Date of Patent: Mar. 18, 2003

(54) DEVICE FOR TEMPERATURE COMPENSATION IN AN ACOUSTIC FLOW METER

(75) Inventor: Jerker Delsing, Piteå (SE)

(73) Assignee: D-Flow Group AB, Slussfors (SE)

( * ) Notice: Subject to any disclaimer, the term of this patent is extended or adjusted under 35 U.S.C. 154(b) by 0 days.

(21) Appl. No.: 09/830,429

(22) PCT Filed: Nov. 3, 1999

(86) PCT No.: PCT/SE99/01981
§ 371 (c)(1),
(2), (4) Date: Jun. 26, 2001

(87) PCT Pub. No.: WO00/26618
PCT Pub. Date: May 11, 2000

(30) Foreign Application Priority Data

Nov. 3, 1998 (SE) ............................................... 9803750

(51) Int. Cl.⁷ ............................................... G01F 1/66
(52) U.S. Cl. ............................... 73/861.29; 73/861.27; 73/861.01
(58) Field of Search ....................... 73/861.29, 861.27, 73/861.28, 861.01

(56) References Cited

U.S. PATENT DOCUMENTS

| | | | |
|---|---|---|---|
| 3,771,117 A | * | 11/1973 | Shaffer et al. ............... 310/327 |
| 4,240,004 A | * | 12/1980 | Coleman .................... 29/25.35 |
| 4,279,167 A | | 7/1981 | Erb et al. ................. 73/861.25 |
| 4,417,480 A | * | 11/1983 | Zacharias, Jr. .............. 310/327 |
| 4,825,117 A | * | 4/1989 | Thomas et al. ............. 310/344 |

FOREIGN PATENT DOCUMENTS

| | | |
|---|---|---|
| DE | 3013482 A1 | 10/1981 |
| EP | 0606536 A1 | 7/1994 |
| JP | 56-115919 A | 9/1981 |

* cited by examiner

*Primary Examiner*—Harshad Patel
(74) *Attorney, Agent, or Firm*—Burns, Doane, Swecker & Mathis, LLP

(57) ABSTRACT

A meter includes a casing (1) with a fluid passage (2), in which two transducer mountings (3, 4) arranged at a distance ($L_b$) from each other support two transducers (5, 6) which are acoustically opposed to each other. Between the transducers (5, 6) there is a distance ($L_u$) over which they transmit and receive sound pulses through a fluid which in a direction (a) flows through the fluid passage (2). On the basis of the transit times of the sound pulses over the distance ($L_u$) both countercurrently with and countercurrently to the direction of flow (a), e.g. the velocity of the flow of the fluid is then calculated. A compensating device (8, 9) is arranged between at least one of the transducers (5, 6) and one of the transducer mounts (3, 4). The compensating device (8, 9) is made of a material having a known function of thermal expansion and having such a length that a longitudinal change, caused by a change in temperature of the fluid, of the distance ($L_b$) between the transducer mounts (3, 4) and, thus, of the distance ($L_u$) between the transducers (5, 6) is essentially compensated for by an opposite longitudinal change of the compensating device (8, 9).

20 Claims, 3 Drawing Sheets

DEVICE FOR TEMPERATURE COMPENSATION IN AN ACOUSTIC FLOW METER

FIELD OF THE INVENTION

The present invention relates to a device in a meter for flow measurement, said meter comprising a casing which is made of a material having a known function of thermal expansion and through which a fluid passage extends, two transducers which are arranged acoustically opposite each other on a transducer mounting each and which are each adapted to repetitively transmit, essentially along a sound line and over a distance $L_u$ between said transducers towards the opposite transducer, sound pulses in a fluid which in a direction flows through the fluid passage, and to receive sound pulses from the opposite transducer after passing through the fluid, and an electronic and calculation unit which is connected to said transducers for excitation and reading thereof and which is adapted to calculate, by means of the transit times of the sound pulses over the distance $L_u$ between said transducers both concurrently with and countercurrently to the direction of flow of the fluid, a volume and/or mass flow and/or a velocity of flow of the fluid through the fluid passage.

BACKGROUND OF THE INVENTION

Both the transit time and sing around technique are well-known techniques that are used, inter alia, in the measuring of flow rate and sonic velocity. FIG. 1 shows the principle of measuring by means of the sing around technique which differs from the transmit time technique mainly by its transmission of sound pulses which is repeated in a manner that will be described below. Through a fluid passage 2 arranged in a meter casing 1 flows a fluid at a velocity v which in the drawing is indicated by an arrow a which also indicates the main direction of flow from the left to the right. The passage 2 has two opposite branches both extending at an angle $\phi$ relative to the longitudinal axis of the passage and, thus, relative to the main direction of flow of the fluid. In each branch an ultrasonic transducer 5, 6 is mounted, which is inclined at an angle $(90°-\phi)$ relative to the longitudinal axis of the passage 2. The transducers 5, 6 are interconnected by means of sing around electronics which is schematically shown in the form of a box 7.

With a view to measuring, for instance, the velocity v of the fluid in the passage 2, sing around loops are established both concurrently with and countercurrently to the direction of flow, which can take place simultaneously or preferably first in one direction, e.g. the upstream direction, by the sing around electronics 7 exciting the transducer 5 to transmit an ultrasonic pulse which is received by the transducer 6 after having passed through the fluid in the passage 2. When the sing around electronics 7 detects that the transducer 6 receives an ultrasonic pulse, it excites the transducer 5 to transmit a new ultrasonic pulse. The thus-established sing around loop is maintained for a predetermined number of turns N. Then the process is repeated in the downstream direction.

The sing around loop will oscillate with a certain period which is called the sing around period and which depends on the sonic velocity c in the fluid between the transducers, the distance $L_u$ between the transducers and the flow velocity. The sing around period $t_1$ in the downstream direction is given by:

$$t_1 = \frac{L_u}{c + v \cdot \cos\phi}$$

and the sing around period $t_2$ in the upstream direction is given by:

$$t_2 = \frac{L_u}{c - v \cdot \cos\phi}$$

If the distance $L_u$ between the transducers and the angle $\phi$ are known and the sing around periods $t_1$ and $t_2$ are measured, e.g. the flow velocity v can be determined according to the following formula:

$$v = \frac{L_u}{2\cos\phi}\left(\frac{1}{t_1} - \frac{1}{t_2}\right)$$

With the same information and with knowledge of the cross-sectional area and the form of the passage 2, also e.g. the volume flow rate in the passage 2 can be determined according to the following formula:

$$Vol = \frac{1}{2} \frac{AL_u\left(\frac{1}{t_1} - \frac{1}{t_2}\right)}{\cos\phi}$$

where Vol is the volume flow rate and A is the cross-sectional area of the fluid passage.

A drawback of the prior-art flow meters of the type in question is that both the distance $L_u$ between the transducers and the cross-sectional area A of the fluid passage are temperature dependent. If thus the temperature of the fluid from an initial value $T_0$ increases, for example, to a value $T_1$, also the material of which the meter casing is made will be affected in course of time, which results in an increase of the distance $L_u$ between the transducers and an increase of the cross-sectional area A. It will be appreciated that this fact must be taken into consideration especially when determining volume or mass flow rates since possible errors in such determination are potentiated.

SUMMARY OF THE INVENTION

In view of the above, the object of the present invention is to provide a device in a meter of the type mentioned by way of introduction, said device obviating the inaccuracies which temperature changes may cause in the meter.

According to the invention, this is achieved by a compensating means in the extension of the sound line being arranged between at least one of the transducer mountings and the associated transducer, said compensating means being made of a material having a known function of thermal expansion and having a length seen in the extension of the sound line so that a dimensional change, caused by a temperature change of the fluid, of the fluid passage along the distance between the transducer mountings, said dimensional change comprising a longitudinal change of the distance between the transducer mountings, is essentially compensated for by an opposite change, caused by the same temperature change, of the compensating means.

A person skilled in the art realises that such a compensating means is relatively easy to provide and dimension since the functions of thermal expansion of different materials are well documented and within reasonable temperature ranges have an essentially linear progress. It will also be appreciated that numeric calculation methods, such as finite element methods (FEM), can be used to calculate a suitable geometry of the compensating means for a given application. Moreover the person skilled in the art realises that by selecting materials having a greater function of thermal expansion for the compensating means, it is possible according to the invention to provide very compact but yet accurate meters, and that in spite of the choice of materials having a non-linear function of thermal expansion, such as plastics, it is according to the invention still possible to provide inexpensive meters with acceptable accuracy. Various embodiments of the invention, based on this knowledge, are defined in the dependent claims.

For an ultrasonic meter, which is of the diagonal type shown in FIG. 1 and has a fluid passage of circular cross-section, it is possible to express the distance $L_u$ between said transducers as stated below, $\phi$ being the angle between the sound line l and the longitudinal axis of the fluid passage, Du being the transducer diameter, Dp being the diameter of the passage and $\alpha_p$ and $\alpha_t$, respectively, being coefficients of thermal expansion of the passage and the compensating member, respectively, assuming a linear function of thermal expansion.

$$L_u = \frac{Dp(1+\alpha_p\Delta T)}{\sin\phi} + \frac{Du(1+\alpha_p\Delta T)}{\tan\phi}$$

The cross-sectional area A can be expressed as:

$$A = \tfrac{1}{4}\pi Dp^2(1+\alpha_p\Delta T)^2$$

This gives if $eq = L_u A$:

$$eq = \frac{1}{4}\left(\frac{Dp(1+\alpha_p\Delta T)}{\sin\phi} + \frac{Du(1+\alpha_p\Delta T)}{\tan\phi}\right)\pi Dp^2(1+\alpha_p\Delta T)^2$$

The temperature dependence is illustrated by the derivative in respect of the temperature, eqd=diff (eq, $\Delta T$), i.e. a differentiation of eq in respect of $\Delta T$:

$$eqd = \frac{1}{4}\left(\frac{Dp\alpha_p}{\sin\phi} + \frac{Du\alpha_p}{\tan\phi}\right)\pi Dp^2(1+\alpha_p\Delta T)^2 +$$
$$\frac{1}{2}\left(\frac{Dp(1+\alpha_p\Delta T)}{\sin\phi} + \frac{Du(1+\alpha_p\Delta T)}{\tan\phi}\right)\pi Dp^2(1+\alpha_p\Delta T)\alpha_p$$

The cross-sectional area times the transducer distance, i.e. $AL_u$, will obtain a temperature dependence owing to longitudinal expansion with the temperature. This will in turn cause an error in ultrasonic flow meters based on the transit time or sing around technique.

By introducing according to the invention a transducer with a compensating member which acts opposite to the temperature-dependent longitudinal changes of the fluid passage, this temperature dependence can be counteracted almost completely. Besides, if a material having a different coefficient of thermal expansion is used, the design of the transducer with the compensating member can be made very compact and simple. Introducing such a transducer with a compensating member having a length $L_t$ in the expression for $L_u$ gives the following expression for the transducer distance with a compensating member, $Lk_u$:

$$Lk_u = \frac{Dp(1+\alpha_p\Delta T)}{\sin\phi} + \frac{Du(1+\alpha_p\Delta T)}{\tan\phi} + 2L_t(1+\alpha_p\Delta T) - 2L_t(1+\alpha_t\Delta T)$$

and if $eqk = Lk_u A$:

$$eqk = \frac{1}{4}\left(\frac{Dp(1+\alpha_p\Delta T)}{\sin\phi} + \frac{Du(1+\alpha_p\Delta T)}{\tan\phi} + 2L_t(1+\alpha_p\Delta T) - 2L_t(1+\alpha_t\Delta T)\right)$$
$$Dp^2(1+\alpha_p\Delta T)^2$$

By seeking the minima of the temperature dependence by differentiation of eqk in respect of $\Delta T$ it is possible to determine how the components included are to be dimensioned to give a practically total independence of the temperature, thus eqd_k=diff(eqd, $\Delta T$):

$$eqd\_k = \frac{1}{4}\left(\frac{Dp\alpha_p}{\sin\phi} + \frac{Du\alpha_p}{\tan\phi} + 2L_t\alpha_p - 2L_t\alpha_t\right)\pi Dp^2(1+\alpha_p\Delta T)^2 +$$
$$\frac{1}{2}\left(\frac{Dp(1+\alpha_p\Delta T)}{\sin\phi} + \frac{Du(1+\alpha_p\Delta T)}{\tan\phi} + 2L_t(1+\alpha_p\Delta T) - 2L_t(1+\alpha_t\Delta T)\right)$$
$$\pi Dp^2(1+\alpha_p\Delta T)\alpha_p$$

If eqd_k is set at 0, and $L_t$ is solved from this equation, the length $(L_t)_{opt}$, which is suitable in this case, of the compensating member is obtained:

$$(L_t)_{opt} = \frac{3}{2}\alpha_p \frac{Dp\tan\phi + Dp\alpha_p\Delta T\tan\phi + Du\sin\phi + Du\alpha_p\Delta T\sin\phi}{(-\alpha_p - 3\alpha_p^2\Delta T + \alpha_t + 3\alpha_t\alpha_p\Delta T)\tan\phi\sin\phi}$$

It is thus obvious from that stated above that it is possible according to the invention to calculate, on the basis of known dimensional conditions of an otherwise arbitrary geometry at a reference temperature $T_0$ and with knowledge of the functions of thermal expansion for the meter casing and the compensating means, a length $L_t$ of the compensating means which is suitable in this case, and it will be appreciated that it is possible to optimise the design of the compensating means by taking into consideration, in the calculation, also the influence of temperature on the transducer diameter Du and the passage diameter Dp.

Moreover it will be appreciated that it is not necessary in all cases to use the compensating means to compensate for both cross-sectional and longitudinal changes. If, in view hereof, one wishes to compensate only for the temperature-dependent longitudinal changes of the fluid passage, it is possible to simplify the necessary calculations to a considerable extent. The conditions which have to prevail in that case can, based on the distance $L_u$ between the above-mentioned transducers, be written as:

$$L_u = L_b(1+\alpha_p(T_0-T)) - 2L_t(1+\alpha_t(T_0-T))$$

where $L_b$ is the distance between the transducer mountings, $L_t$ is the length of the compensating means, $T_0$ is the current temperature, $\alpha_t$ is the function of thermal expansion of the compensating means and $\alpha_p$ is the function of thermal expansion of the casing. A differentiation of this equation in respect of temperature then gives:

$$dL_u = L_b\alpha_b - 2L_t\alpha_t$$

For $dL_u$ to be zero, the following must apply:

$$L_b\alpha_b = 2L_t\alpha_t$$

thus:

$$L_t = \frac{L_b\alpha_b}{2\alpha_t}$$

DESCRIPTION OF THE DRAWINGS

The invention will now be described in more detail with reference to the accompanying schematic drawings, in which the same reference numerals are used for equivalent components and in which FIG. 1, which has already been discussed, is a schematic view which by means of a prior-art meter illustrates the principle of the sing around technique.

DESCRIPTION OF THE PREFERRED EMBODIMENTS

Figure 1:
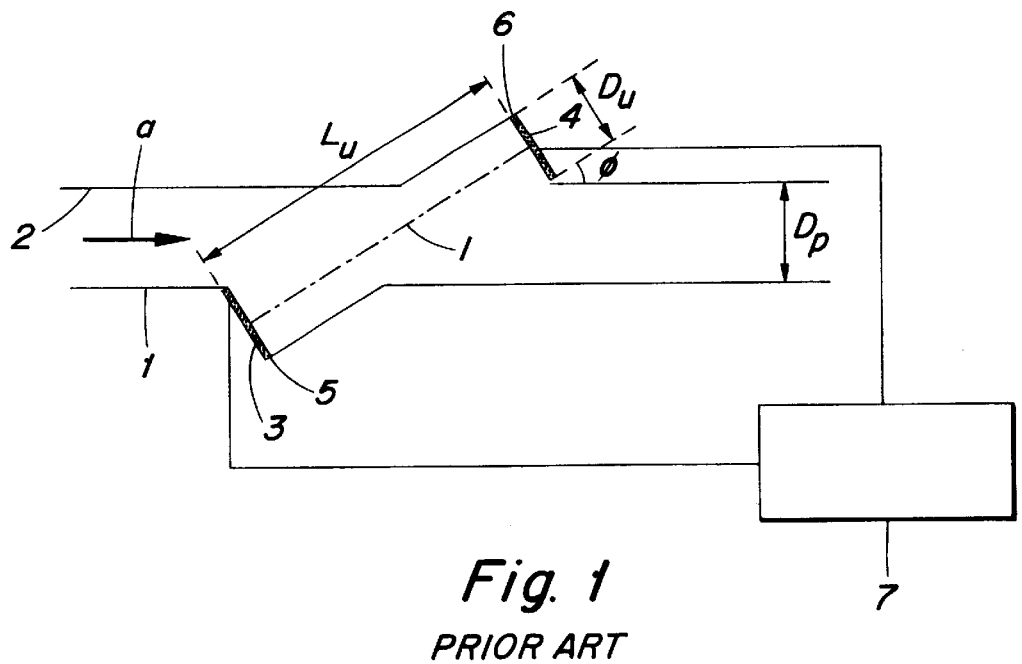

FIG. 1 has already been described above and will therefore not be discussed once more.

Figure 2:
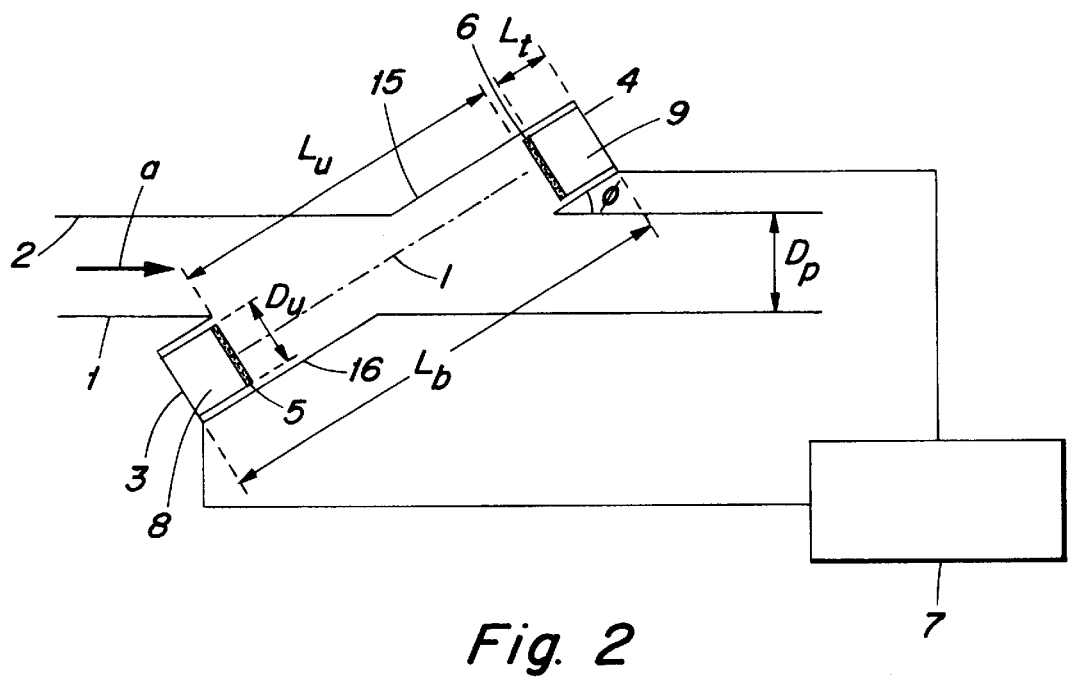
FIG. 2 illustrates a meter, corresponding to the meter in FIG. 1, comprising a device according to the invention.

FIG. 2 shows a meter corresponding to the one in FIG. 1, which comprises a casing 1 through which extends a fluid passage 2. The passage 2 has two opposite branches 15, 16 extending obliquely to the passage 2. Each branch defines a base which also defines a transducer mounting 3, 4. Between these mountings there is a distance $L_b$ which is affected in connection with temperature changes so that the distance increases with an increasing temperature and decreases with a decreasing temperature. A transducer 5, 6 is mounted on each transducer mountings 3, 4. The transducers 5, 6 are, like in the prior-art meter, arranged acoustically opposite each other and are adapted to transmit, along a sound line 1 over a distance $L_u$, sound pulses to the opposite transducer 5, 6 and, from the same, receive sound pulses. The sound pulses are allowed to pass through a fluid which in a direction of a flow a flows through the fluid passage 2.

Since the length of the distance $L_u$ is affected by the temperature and this also affects the velocity v calculated for the fluid flow, a compensating member 8, 9 is according to the invention arranged behind each transducer 5, 6 between this and the associated transducer mounting 3, 4. The member 8, 9 has a temperature expansion function which is calculated as stated above and is greater than that of the casing 1 and thus contributes to the fact that the previously existing temperature influence on the distance $L_u$ is eliminated by opposite expansion. It goes without saying that this also applies in the corresponding dimensioning to any other mechanical influence that temperature changes may have, for example on the cross-sectional area of the fluid passage 2.

Figure 3:
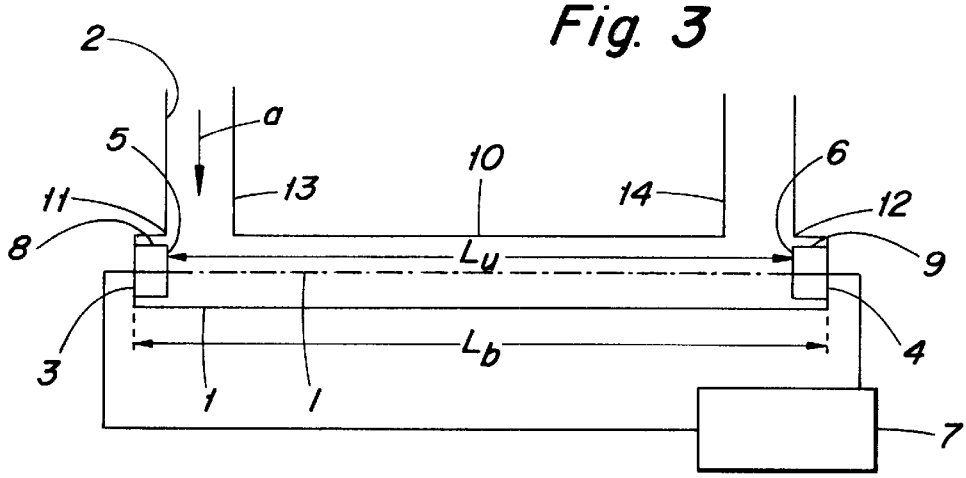
FIG. 3 illustrates an alternative meter comprising a device according to the invention.

FIG. 3 shows a different type of meter. This, too, comprises a casing 1 through which a fluid passage 2 extends. However, the fluid passage 2 is in this case U-shaped and has a straight portion 10, to which at the ends 11, 12 two right-angled bends 13, 14 connect. The bends 13, 14 each define a mounting 3, 4 for a transducer 5, 6. As described above, there is a temperature-dependent distance $L_b$ between the mountings 3, 4, and a distance $L_u$ between said transducers 5, 6. Between each mounting 3, 4 and the associated transducer 5, 6 a length-compensating member is arranged, which is so dimensioned and made of such a material that the conditions desired according to the invention are satisfied.

Figure 4:
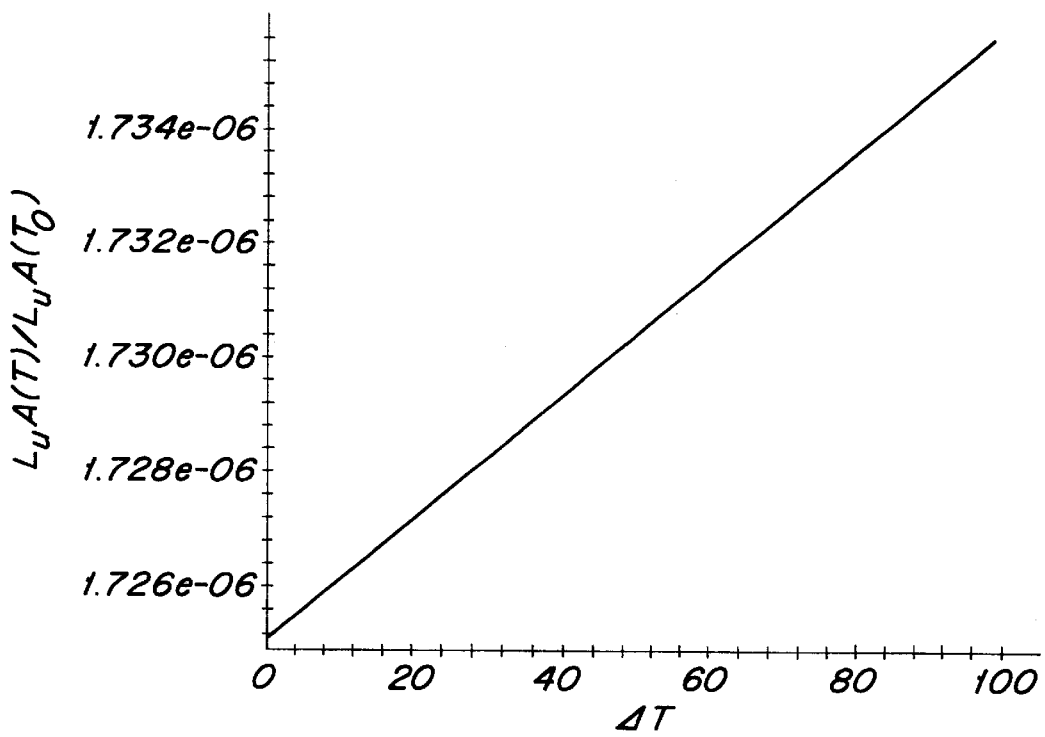
FIG. 4 is a diagram of the temperature dependence of a prior-art meter.
Figure 5:
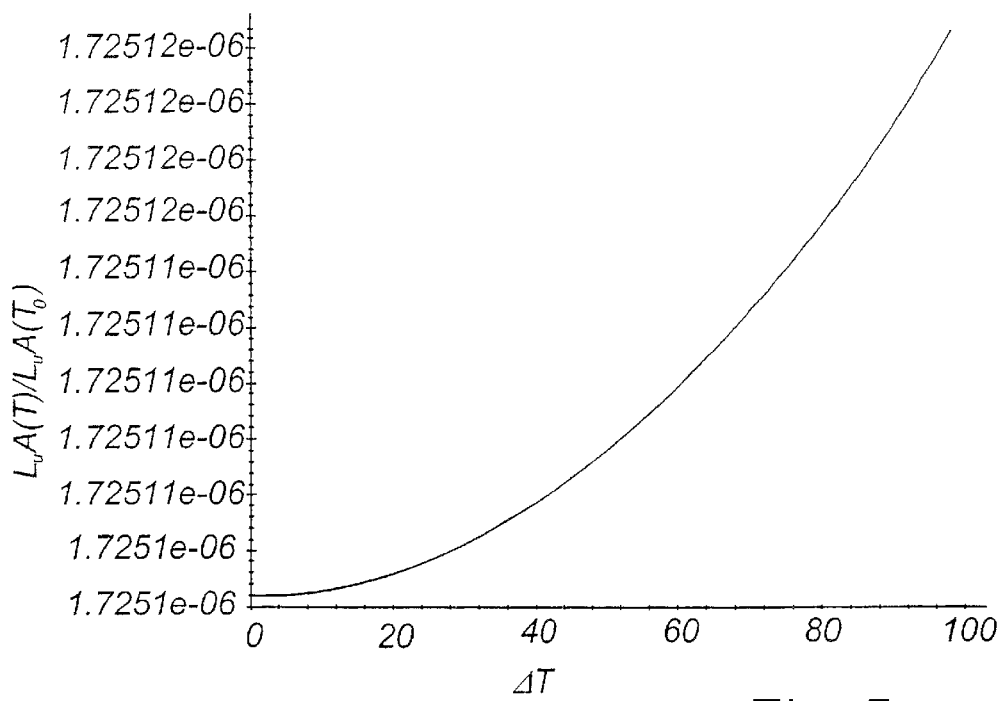
FIG. 5 is a diagram of the temperature dependence of a meter comprising the device according to the invention.

FIGS. 4 and 5 are diagrams for a meter of prior-art type and for a meter comprising a compensating device according to the invention, said diagrams illustrating errors caused by temperature changes. By reproducing $[L_uA(T)]/[L_uA(T_0)]$ as a function of the temperature, it is possible to distinctly illustrate the temperature dependence. In the two examples shown, the meter casing is made of metal ($\alpha=2\times10^{-5}$) and for the compensating device a plastic material ($\alpha=2\times10^{-4}$) has been used. As is evident, when using the inventive device the error will be smaller than 0.002%, whereas for the prior-art meter it is about 0.6% seen over a temperature range of 0–100° C., thus less by a factor slightly higher than 100 compared to the prior-art meter. This means that the invention can be used either to provide in a simple manner very accurate meters or to manufacture meters with great accuracy of less expensive materials than before. Experiments with a meter casing made of plastic only ($\alpha=2\times10^{-4}$) have shown that thanks to the invention it would be possible, without any particular difficulty, to confine the error to 0.6% within the above-mentioned temperature range. Corresponding errors, without the inventive compensating device and with a meter casing made of plastic only, will in this case amount to about 6%.

What is claimed is:

1. A device in a meter for flow measurement, said meter comprising:
    a casing (1) which is made of a material having a known function of thermal expansion and through which a fluid passage (2) extends,
    two transducers (5, 6) which are arranged acoustically opposite each other on a transducer mounting (3, 4) each and which are each adapted to repetitively transmit, essentially along a sound line (l) and over a distance ($L_u$) between said transducers (5, 6) towards the opposite transducer (5, 6), sound pulses in a fluid which in a direction (a) flows through the fluid passage (2), and to receive sound pulses from the opposite transducer (5, 6) after passing through the fluid,
    an electronic and calculation unit (7) which is connected to said transducers (5, 6) for excitation and reading thereof and which is adapted to calculate, by means of the transit times ($t_1$, $t_2$) of the sound pulses over the distance ($L_u$) between said transducers both concurrently with and countercurrently to the direction of flow (a) of the fluid, at least one of a volume, mass flow and a velocity of flow (v) of the fluid through the fluid passage (2), and
    a compensating means (8, 9) provided in the extension of the sound line (l) and is arranged between at least one of the transducer mountings (3, 4) and the associated transducer (5, 6), said compensating means (8, 9) being made of a material having a known function of thermal expansion, wherein a length of the fluid passage in the direction of the sound line (l) dimensional changes due to a temperature change of the fluid in the fluid passage (2), said dimensional change comprising a longitudinal change of the distance ($L_b$) between the transducer mountings (3, 4), the longitudinal change is essentially compensated for by an opposite longitudinal change, caused by the same temperature change, of the compensating means (8, 9).

2. A device as claimed in claim 1, characterised in that the material of which the compensating means (8, 9) is made has an essentially linear function of thermal expansion.

3. A device as claimed in claim 2, characterised in that the material of which the compensating means (8, 9) is made has a greater function of thermal expansion than the material of which the casing (1) is made.

4. A device as claimed in claim 3, characterised in that said dimensional change of the fluid passage (2) comprises a change of the cross-sectional area (A) of the fluid passage.

5. A device as claimed in claim 4, characterised in that the cross-sectional area (A) of the fluid passage (2) is substantially circular.

6. A device as claimed in claim 2, characterised in that the fluid passage (2) has two opposite branches (15, 16) which are inclined at an angle (φ) relative to the direction of flow (a) and in which one each of the transducer mountings (3, 4) is mounted.

7. A device as claimed in claim 2, wherein the fluid passage (2) has a straight portion (10) from each end (11, 12) of which a passage branch (13, 14) projects, one transducer mounting (3, 4) being arranged at each end (11, 12).

8. A device as claimed in claim 1, characterised in that the material of which the compensating means (8, 9) is made has a greater function of thermal expansion than the material of which the casing (1) is made.

9. A device as claimed in claim 8, characterised in that said dimensional change of the fluid passage (2) comprises a change of the cross-sectional area (A) of the fluid passage.

10. A device as claimed in claim 9, characterised in that the cross-sectional area (A) of the fluid passage (2) is substantially circular.

11. A device as claimed in claim 8, characterised in that the fluid passage (2) has two opposite branches (15, 16) which are inclined at an angle (φ) relative to the direction of flow (a) and in which one each of the transducer mountings (3, 4) is mounted.

12. A device as claimed in claim 8, wherein the fluid passage (2) has a straight portion (10) from each end (11, 12) of which a passage branch (13, 14) projects, one transducer mounting (3, 4) being arranged at each end (11, 12).

13. A device as claimed in claim 1, characterised in that said dimensional change of the fluid passage (2) comprises a change of the cross-sectional area (A) of the fluid passage.

14. A device as claimed in claim 13, characterised in that the cross-sectional area (A) of the fluid passage (2) is substantially circular.

15. A device as claimed in claim 14, characterised in that the fluid passage (2) has two opposite branches (15, 16) which are inclined at an angle (φ) relative to the direction of flow (a) and in which one each of the transducer mountings (3, 4) is mounted.

16. A device as claimed in claim 14, wherein the fluid passage (2) has a straight portion (10) from each end (11, 12) of which a passage branch (13, 14) projects, one transducer mounting (3, 4) being arranged at each end (11, 12).

17. A device as claimed in claim 13, characterised in that the fluid passage (2) has two opposite branches (15, 16) which are inclined at an angle (φ) relative to the direction of flow (a) and in which one each of the transducer mountings (3, 4) is mounted.

18. A device as claimed in claim 13, wherein the fluid passage (2) has a straight portion (10) from each end (11, 12) of which a passage branch (13, 14) projects, one transducer mounting (3, 4) being arranged at each end (11, 12).

19. A device as claimed in claim 1, characterised in that the fluid passage (2) has two opposite branches (15, 16) which are inclined at an angle (φ) relative to the direction of flow (a) and in which one each of the transducer mountings (3, 4) is mounted.

20. A device as claimed in claim 1, wherein the fluid passage (2) has a straight portion (10) from each end (11, 12) of which a passage branch (13, 14) projects, one transducer mounting (3, 4) being arranged at each end (11, 12).

* * * * *